UNITED STATES PATENT OFFICE.

WILLIAM ESTY, OF FITCHBURG, ASSIGNOR TO VITRIFIED WHEEL AND EMERY COMPANY, OF ASHLAND, MASSACHUSETTS.

IMPROVEMENT IN EMERY-WHEELS.

Specification forming part of Letters Patent No. 192,058, dated June 19, 1877; application filed January 9, 1877.

*To all whom it may concern:*

Be it known that I, WILLIAM ESTY, of Fitchburg, in the county of Worcester and State of Massachusetts, have invented certain new and useful Improvements in the Manufacture of Emery-Wheels and other Artificial Stone, of which the following, taken in connection with the accompanying drawings, is a specification:

The object of my invention is the production of artificial stones for grinding purposes that shall be sufficiently porous to admit of water being forced through the stone from the center to its circumference by centrifugal action, in accordance with invention set forth and described in the Letters Patent No. 164,692, granted to H. M. Putnam and myself June 22, 1875.

It has been found, in attempting to introduce the above-mentioned invention, that the emery-wheels in common use are not sufficiently porous to render the use of the feeding device, patented as above, of practical utility, and hence my present invention, which consists in combining in a coherent mass, for the production of a porous stone, particles or grains of emery, corundum, or other sharp gritty substances, about an equal quantity of the finest flour of the same material, and about one-half of the same quantity of broken or ground glass, slate, or other vitreous substances, and subjecting the mass to an intense heat, sufficient to melt the glass or other vitreous substance, and cause it to be absorbed by the flour which forms the body, to hold the mass together, leaving cavities where the particles of vitreous substance previously were.

The process of manufacturing my improved emery-wheels or artificial stone for grinding or polishing purposes is as follows: I take about equal parts of grain or kernel emery, of suitable fineness, and the finest flour or impalpable powder of emery, and about one-half the same quantity of powdered or granulated glass, slate, borax, or other vitreous substance, and mix them thoroughly, then moisten the mass with gum-water, sour beer, or equivalent liquid, pass the whole through a sieve to remove all lumps, mold it into the desired form, dry it, and then subject it to a great heat in a kiln to cement the whole together.

If corundum is used for the grit, flour of corundum is mixed with it, and the whole treated as described, and so of all the other substances mentioned, the flour of the same material that is used to furnish the grit or cutting quality being used to cement the particles of grit together in a cohesive mass.

The great heat to which the mass is subjected melts the glass, slate, borax, or equivalent material, and causes them to be absorbed or taken up by the flour which forms the body, to hold the kernels, leaving an almost innumerable number of small cavities or cells distributed through all parts of the stone, rendering it porous, so that it will absorb or take up water like a sponge.

The stone may be made more or less porous, according to the use to which it is to be applied, by increasing or diminishing the quantity of broken glass or other vitreous substance used in the composition of which the wheel or other stone is composed.

The temperature of the kiln or furnace in which the stones are baked should be between a bright-red and white heat.

What I claim as new, and desire to secure by Letters Patent of the United States, is—

A porous stone for grinding or polishing purposes, composed of emery, corundum, or other sharp gritty substance reduced to grains or kernels of suitable fineness, mixed with about an equal quantity of the fine flour of the same material, and a quantity of broken glass, slate, or other vitreous substance, the whole being cemented into a cohesive mass by heat, substantially as described.

Executed at Boston, Massachusetts, this 4th day of January, A. D. 1877.

WILLIAM ESTY.

Witnesses:
N. C. LOMBARD,
E. A. HEMMENWAY.